United States Patent
Chavez et al.

(10) Patent No.: US 11,430,028 B1
(45) Date of Patent: Aug. 30, 2022

(54) DIRECTED INFORMATION ASSISTANCE SYSTEMS AND METHODS

(71) Applicant: United Services Automobile Association (USAA), San Antonio, TX (US)

(72) Inventors: Carlos J P Chavez, San Antonio, TX (US); David James, San Antonio, TX (US); Rachel Elizabeth Csabi, Frisco, TX (US); Quian Jones, San Antonio, TX (US); Mitzi Ruiz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 22 days.

(21) Appl. No.: 16/200,084

(22) Filed: Nov. 26, 2018

Related U.S. Application Data

(60) Provisional application No. 62/593,099, filed on Nov. 30, 2017.

(51) Int. Cl.
*G06Q 30/04* (2012.01)
*G06F 16/955* (2019.01)
*G06Q 20/32* (2012.01)

(52) U.S. Cl.
CPC ......... *G06Q 30/04* (2013.01); *G06F 16/9558* (2019.01); *G06Q 20/322* (2013.01)

(58) Field of Classification Search
CPC .................. G06Q 20/322; G06F 16/9558
See application file for complete search history.

(56) References Cited

U.S. PATENT DOCUMENTS

| | | | | |
|---|---|---|---|---|
| 1,838,389 | A | * | 12/1931 | Goldberg .................. G06T 9/20 346/33 R |
| 3,437,824 | A | * | 4/1969 | Lohmann ............... G02B 27/46 250/550 |

(Continued)

FOREIGN PATENT DOCUMENTS

CN 108476258 A * 8/2018 ........... G06F 3/0482

OTHER PUBLICATIONS

Check 21 Act of 2003, Available at: https://www.govinfo.gov/content/pkg/PLAW-108publ100/pdf/PLAW-108publ100.pdf (Year: 2003).*

(Continued)

*Primary Examiner* — David P Sharvin
*Assistant Examiner* — Gregory Harper
(74) *Attorney, Agent, or Firm* — Fletcher Yoder, P.C.

(57) ABSTRACT

A system may include a database that has a number of datasets regarding a number of commercial items. The system may also include a processor that may communicative couple to a mobile electronic device. The processor may receive an image of a commercial item from the mobile electronic device, determine an identity of the commercial item based on the image and the number of datasets in the database, and determine one or more information links relevant to the commercial item based on the identity. The one or more information links may display information regarding the commercial item. The processor may then send the one or more information links to a mobile electronic device. The mobile electronic device may then display the one or more information links with the image.

20 Claims, 3 Drawing Sheets

(56) References Cited

U.S. PATENT DOCUMENTS

| | | | | |
|---|---|---|---|---|
| 6,400,845 B1* | 6/2002 | Volino | G06K 9/2054 | 358/462 |
| 6,493,685 B1* | 12/2002 | Ensel | G06Q 20/102 | 705/34 |
| 6,678,417 B1* | 1/2004 | Baumgartner | H04N 19/94 | 348/153 |
| 8,548,909 B1* | 10/2013 | Snow | G06F 16/986 | 705/42 |
| 8,805,125 B1* | 8/2014 | Kumar | G06K 9/344 | 382/309 |
| 9,582,779 B1* | 2/2017 | Bevan | G06Q 10/0633 | |
| 9,779,296 B1* | 10/2017 | Ma | G06V 30/414 | |
| 10,210,142 B1* | 2/2019 | Jain | G06F 40/134 | |
| 2003/0028518 A1* | 2/2003 | Mankoff | G06Q 10/10 | |
| 2005/0033685 A1* | 2/2005 | Reyes | G06Q 20/04 | 705/39 |
| 2009/0152343 A1* | 6/2009 | Carter | G06Q 10/0633 | 235/379 |
| 2012/0099780 A1* | 4/2012 | Smith | G06Q 20/12 | 382/136 |
| 2012/0229440 A1* | 9/2012 | Rao | G07F 7/0806 | 345/211 |
| 2013/0085941 A1* | 4/2013 | Rosenblatt | G06Q 20/1085 | 705/44 |
| 2013/0091058 A1* | 4/2013 | Huster | G06Q 20/322 | 705/44 |
| 2013/0320081 A1* | 12/2013 | Olson | G06Q 20/341 | 235/488 |
| 2014/0046768 A1* | 2/2014 | Hayes | G06Q 30/0256 | 705/14.64 |
| 2014/0180790 A1* | 6/2014 | Boal | G06Q 30/0255 | 705/14.42 |
| 2014/0207680 A1* | 7/2014 | Rephlo | G06Q 20/322 | 705/44 |
| 2015/0046341 A1* | 2/2015 | Cheng | G06Q 30/0281 | 705/304 |
| 2015/0073925 A1* | 3/2015 | Renfroe | G06Q 30/0207 | 705/15 |
| 2015/0073983 A1* | 3/2015 | Bartenstein | G06Q 20/325 | 705/41 |
| 2015/0324770 A1* | 11/2015 | Starikova | G06Q 20/10 | 705/40 |
| 2015/0324902 A1* | 11/2015 | Starikova | G06Q 40/02 | 705/35 |
| 2015/0348001 A1* | 12/2015 | Van Os | G06Q 20/322 | 705/44 |
| 2016/0012433 A1* | 1/2016 | Marenick | G06Q 20/322 | 705/72 |
| 2016/0019529 A1* | 1/2016 | Wang | G06K 9/3258 | 705/41 |
| 2016/0063484 A1* | 3/2016 | Carpenter | G06Q 20/354 | 705/41 |
| 2016/0105546 A1* | 4/2016 | Keys | H04M 7/003 | 379/88.01 |
| 2016/0253651 A1* | 9/2016 | Park | G07F 9/023 | 705/39 |
| 2017/0024742 A1* | 1/2017 | Khan | G06Q 20/4014 | |
| 2017/0093651 A1* | 3/2017 | Mohammad | H04L 67/00 | |
| 2017/0126749 A1* | 5/2017 | Jones-McFadden | G06F 3/04842 | |
| 2017/0185276 A1* | 6/2017 | Lee | G06F 3/04883 | |
| 2019/0080416 A1* | 3/2019 | Smith | G06N 20/00 | |

OTHER PUBLICATIONS

"Banking in a Snap: Mobile Image Capture Can Transform Financial Services", Aug. 27, 2015. Available at: https://www.fiserv.com/content/dam/fiserv-com/resources/Mobile-Image-Capture-White-Paper-August-2015.pdf (Year: 2015).*

* cited by examiner

DIRECTED INFORMATION ASSISTANCE SYSTEMS AND METHODS

CROSS REFERENCE TO RELATED APPLICATION

This application claims priority to U.S. Provisional Application No. 62/593,099, titled "Directed Information Assistance Systems and Methods," filed Nov. 30, 2017, the entire contents of which is hereby incorporated by reference in its entirety for all purposes.

BACKGROUND

The present disclosure relates generally to systems and methods for providing directed information assistance systems and methods. More specifically, the present disclosure relates to determining and displaying information links closely related to an item viewed via an electronic display to enable quick access to additional information regarding the item.

As electronic devices become more integrated into daily procedures, improved systems and methods for using the electronic devices to obtain information concerning objects in the presence of electronic device users are desired. That is, an electronic device user may seek to obtain information about an object by inputting text identifying the object into a data field that may be used to search various electronic resources for information concerning the object. However, as the technology incorporated into these electronic devices increase, the electronic devices may become capable of identifying the information using various other techniques.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a database that has a number of datasets regarding a number of commercial items. The system may also include a processor that may communicative couple to a mobile electronic device. The processor may receive an image of a commercial item from the mobile electronic device, determine an identity of the commercial item based on the image and the number of datasets in the database, and determine one or more information links relevant to the commercial item based on the identity. The one or more information links may display information regarding the commercial item. The processor may then send the one or more information links to a mobile electronic device. The mobile electronic device may then display the one or more information links with the image.

In another embodiment, a non-transitory computer-readable medium may include computer-executable instructions that, when executed, cause a processor to receive an image from an electronic device, such that the image comprises an indication of a service provider. The processor may then determine an identity of the service provider based on the indication, determine an affiliation between a user of the electronic device and the identity of the service provider, and determine one or more information links associated with the service provider based on the affiliation. The processor may then send the one or more information links to the electronic device, such that the electronic device may display the one or more information links with the image.

In yet another embodiment, a method may include receiving, via a processor, an image of a commercial item from a mobile electronic device. The method may also include determining an identity of the commercial item based on the image and a plurality of datasets stored in a database and determining one or more information links relevant to the commercial item based on the identity. The one or more information links may display information regarding the commercial item. The method may then include sending the one or more information links to a mobile electronic device, such that the mobile electronic device may display the one or more information links with the image.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
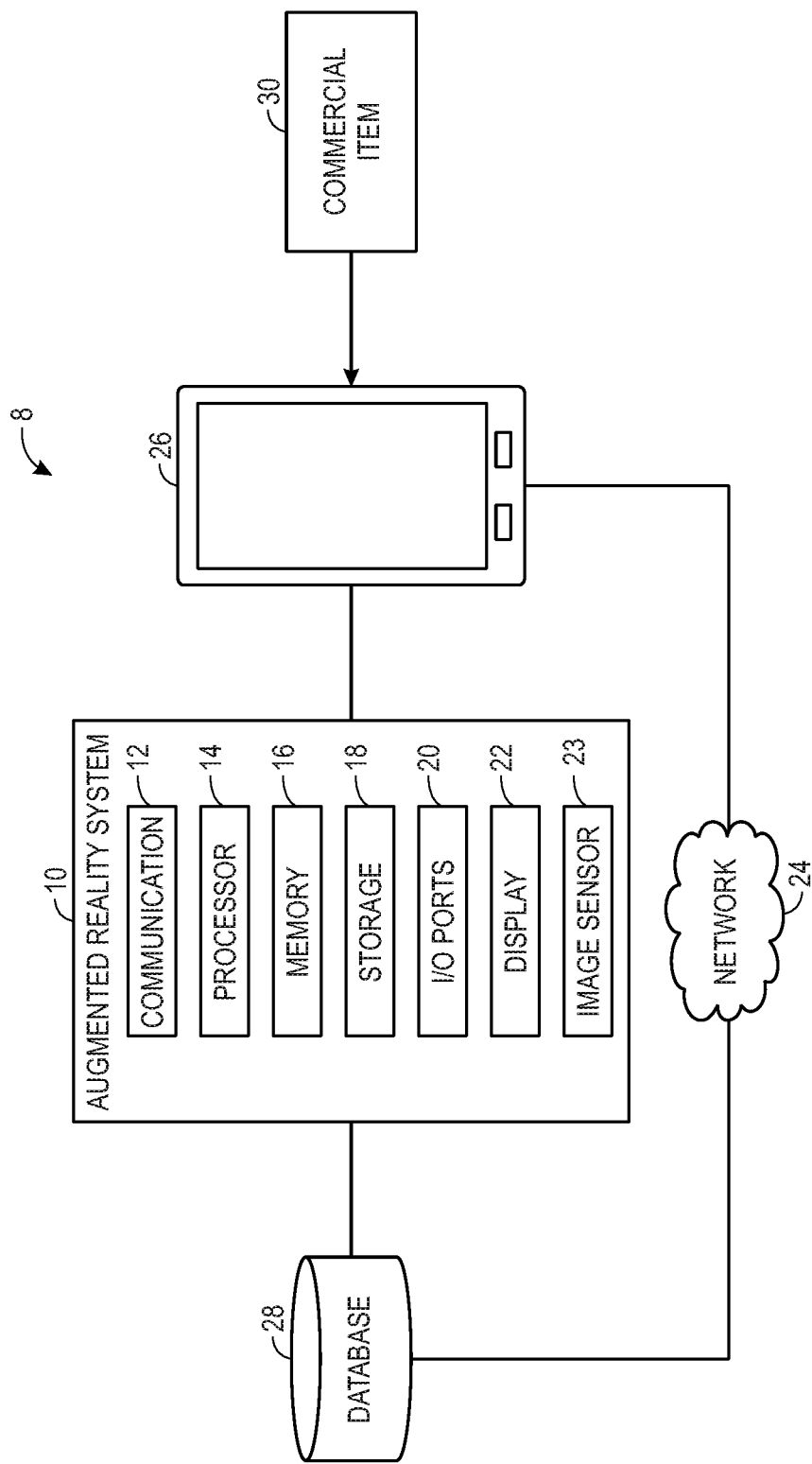
FIG. 1 illustrates a block diagram of an information assistance system including a computing system communicatively coupled to a number of data sources, in accordance with embodiments described herein.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Questions or inquiries regarding certain commercial items, such as credit cards or billing statements, may involve a user (e.g., inquirer) calling a representative of some agency or visiting an online site to acquire the information they are seeking. For instance, when a customer has an inquiry related to the balance or payment due on his credit card, or other question, the customer may call some representative associated with the agency or a general automated call center. Based on inputs or selections by the customer to certain questions, the customer may be directed to a representative that may be able to answer his question.

However, it is presently recognized that many customers may wish to have quicker, easier, and more personalized access to information regarding a particular commercial item at which the customer may be viewing contemporaneously. With this in mind, in some embodiments, customers may employ a computing system that is capable of recognizing commercial items depicted in an electronic image, such that the computing system may provide quick and even personalized information related to that commercial item. On-demand or automated access to information directed to a specific commercial item may reduce call volume received at a call center for questions regarding the commercial item that may be addressed without human intervention. As a result, the customer may obtain quicker and easier access to relevant information via the computing system. Moreover, the computing system may enable customer calls to be directed to a correct representative in instances where the customer decides to call based on the provided relevant information. To provide such on-demand, directed information, systems in accordance with the present embodiments may determine an identity of an item input by the customer and may access call or search data to determine frequently asked questions or frequently accessed links relevant to the item. The systems may then provide the relevant information to the customer via an electronic display, and may provide access to a particular representative that may answer any further questions. Additional details regarding systems and techniques for providing directed information regarding commercial items will be discussed below with reference to FIGS. 1-5.

By way of introduction, FIG. 1 is a block diagram of an information assistance system 8 that may include a computing system 10 communicatively coupled to a variety of data sources that may assist the computing system 10 in determining and providing directed information relevant to a commercial item. The computing system 10 may include any suitable computer device, such as a general-purpose personal computer, a laptop computer, a tablet computer, a mobile computer, and the like that includes specific computer-readable instructions in accordance with present embodiments. The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display 22, an image sensor 23, and the like. The communication component 12 may be a wireless or wired communication component that may facilitate communication between the computing system 10 and various other computing systems via a network, the Internet, or the like.

The processor 14 may be any type of computer processor or microprocessor capable of executing computer-executable code. The processor 14 may also include multiple processors that may perform the operations described below.

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from a user of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10. The image sensor 23 may be a sensor capable of acquiring image data. As such, the image sensor 23 may be a camera or other suitable image capturing device (e.g., scanner).

It should be noted that the computing system 10 should not be limited to include the components described above. Instead, the components described above with regard to the computing system 10 are examples, and the computing system 10 may include additional or fewer components relative to the illustrated embodiment.

In certain embodiments, the computing system 10 may be communicatively coupled to a network 24, which may include collections of computing systems, the Internet, an Intranet system, or the like. The network 24 may facilitate communication between the computing system 10 and various other data sources. For instance, the network 24 may be communicatively coupled to a mobile device 26. In some embodiments, the network 24 may also be communicatively coupled to one or more databases 28, which may store data regarding identifying commercial items, historical call or search data that may include relevant information related to particular commercial items, such as frequently asked questions and/or frequently accessed links or actions, representative directory information, and the like. Such data from the database 28 may be used by the computing system 10 to determine what types of information and/or information links may be relevant to each commercial item.

Referring back to the mobile device 26, the mobile device 26 may be used to capture an image of a commercial item 30 when the customer would like to receive information relevant to the commercial item 30. As such, the mobile device 26 may include similar components described as part of the computing system 10. In one embodiment, if the customer would like to know a balance due on their credit card or would like access to pay the balance due, the customer may use the mobile device 26 to capture an image of their credit card. The image of the commercial item 30 may be sent to the computing system 10 via the network 24. The mobile device 26 may be and electronic device, such as a phone, tablet, or other device capable of capturing and/or viewing images.

The computing system 10 may receive the captured image of the commercial item 30 from the mobile device 26 and/or the network 24. The computing system 10 may then determine the identity of the commercial item 30. Image training or tagging (e.g., machine learning) may be used to train the computing system 10 to recognize the identity of particular items. The computing system 10 may be trained to recognize certain commercial items 30 despite identifiers that are present on the commercial item 30, such as a name, number, or other identifier. After the computing system 10 has identified the commercial item 30, the computing system 10 may determine what types of information or information links are relevant to the commercial item 30. The computing system 10 may send the information links to the mobile device 26, which may then present the information links via an electronic display. As such, the computing system 10 may provide relevant and directed information to the customer based on the commercial item 30 that the customer has provided. As a result, the customer may obtain relevant information without calling an organization or agency associated with the commercial item 30. In this way, organizations may reduce a number of calls received by the organization, thereby enabling the organization to more efficiently answer the calls that they receive.

It should be understood that, while the computing system 10 is discussed in relation to the organization or agency, the customer, and commercial items 30, the computing system 10 may be used to determine and provide to a user on-demand directed information links relevant to any type of item and/or provider. That is, although the computing system 10 may not have an association or relationship to the organization that corresponds to the commercial item 30, the computing system 10 may use available resources (e.g., Internet, database) to determine relevant information regarding the commercial item 30.

Figure 2:
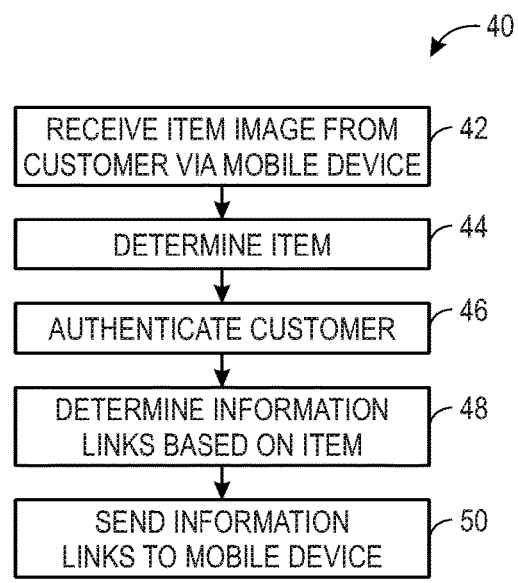
FIG. 2 illustrates a flow chart of a method for determining and displaying directed information links based on an item image and data acquired from the data sources of FIG. 1, in accordance with embodiments described herein.

With the foregoing in mind, FIG. 2 illustrates a flow chart of a method 40 for providing relevant information to the customer based on the image of the commercial item 30 and data acquired from the database 28. In general, the computing system 10 may receive an image of the particular commercial item 30 and provide directed information links to the customer relevant to the commercial item 30. The commercial item 30 may be any item related to the services provided by a respective organization. The commercial item 30 may include a credit card, a billing statement, a service (e.g., insurance) card, or another item. The directed information links may include links and/or URL links that may cause information to be displayed, may cause a device to access a particular website (e.g., URL links), cause a device to dial and connect to a particular phone number, and the like. Although the method 40 is described in a particular order, it should be noted that the method 40 may be performed in any suitable order and is not limited to the order presented herein. It should also be noted that although each block is described as below in the method 40 as being performed by the computing system 10, other suitable computing systems may perform the methods described herein.

Referring now to FIG. 2, at block 42, the computing system 10 may receive the image of the commercial item 30 from the mobile device 26, directly from the image sensor 23, uploaded or input by the user, and the like. As previously discussed, the customer may use the mobile device 26 to capture an image of the commercial item 30 regarding which they have an inquiry or related to which they would like to complete an action. The computing system 10 may receive the image of the commercial item 30 directly from the mobile device 26 or via the network 24. After receiving the image of the commercial item 30, at block 44, using image recognition, the computing system 10 may determine an identity of the commercial item 30 in the image.

In some embodiments, the computing system 10 may be trained, via machine learning, to recognize a particular type of commercial item 30 regardless of the name, number, or other identifier that may be present on the commercial item 30. For example, the computing system 10 may ignore personal or variable information such as a name, number, or other data depicted on the commercial item 30 and use remaining features to identify the commercial item 30. Identification may involve comparing features of the commercial item 30 to a collection of known images of commercial items 30, which may be stored in the database 28. In some embodiments, the computing system 10 may confirm the type of the commercial item 30 with the customer via the mobile device 26, such that a confirming image is provided. The confirming image maybe a stock image (e.g., replacement image) of the commercial item 30 of the type received from the customer, which may be saved in the database 28. In such embodiments, the replacement image of the commercial item 30 may be displayed on the mobile device 26 and may be used by the computing system 10 to further identify the commercial item 30 and determine the relevant information links. Further, in some embodiments, if the replacement image of the commercial item 30 is used, which may increase efficiency as the image quality may be greater, the computing system 10 may populate any identifiers from the image received from the mobile device 26 onto the replacement image of the commercial item 30.

After the computing system 10 has identified the commercial item 30, in some embodiments, at block 46, the computing system 10 may authenticate (e.g., verify) the identity of the customer. Authentication of the customer may be performed based on the mobile device 26 and/or based on identifiers, such as name, number, or another identifier, that may be found in the image of the commercial item 30. In some embodiments, the mobile device 26, or an application used to send the image to the computing system 10, may contain identifiers that may identify and authenticate the customer. For example, an application used to send the image of the commercial item 30 to the computing system 10 may be a password-protected application. As another example, the mobile device 26 and/or the application that may be used to send the image of the commercial item 30 to the computing system 10 may be associated with an account of the customer. Additionally, in some embodiments, the computing system 10 may recognize customer identifiers on the image of the commercial item 30. For example, in the case of a credit card, the computing system 10 may recognize a credit card number or customer name, which may be linked to the account of the customer. Further, in some embodiments, the computing system 10 may receive one or more images of the customer's face that may be used to authenticate the customer. Such authentication may verify that the information provided by the computing system 10 is being provided to the correct customer, and, in some embodiments, may enable the information provided to be personalized to the customer.

Next, at block 48, the computing system 10 may determine information and/or information links (e.g., network or web links) that are relevant to the customer based on the commercial item 30, the customer, and the like. The computing system 10 may further determine information and information links relevant to the commercial item 30 based on data from the database 28. For example, the computing system 10 may determine frequently asked questions and/or frequently accessed actions related to the commercial item 30 based on call and/or search history data stored in the database 28. Relationships between particular commercial items 30 and call and/or search history data may enable the computing system 10 to determine information links relevant to the commercial item 30 that may be helpful to the customer. For example, if the commercial item 30 is a credit card, the call and/or search history data may indicate that customers frequently inquire about a current balance due on the credit card, a request to pay the current balance due, a credit increase request, and the like.

After the computing system 10 has determined the relevant information links based on the image of the commercial item 30, at block 50, the computing system 10 may send the determined relevant information links to the mobile device 26. The information links may be displayed via the mobile device 26 as a superimposed overlay on the image of the commercial item 30, as discussed in greater detail with reference to FIG. 3. As such, the computing system 10 may provide the customer with on-demand directed information and/or accessible links based on the commercial item 30. The customer may then be able to access the provided relevant information links via the mobile device 26 to acquire the information they seek regarding the commercial item 30, without going through a search, call menu, or representative.

Figure 3:
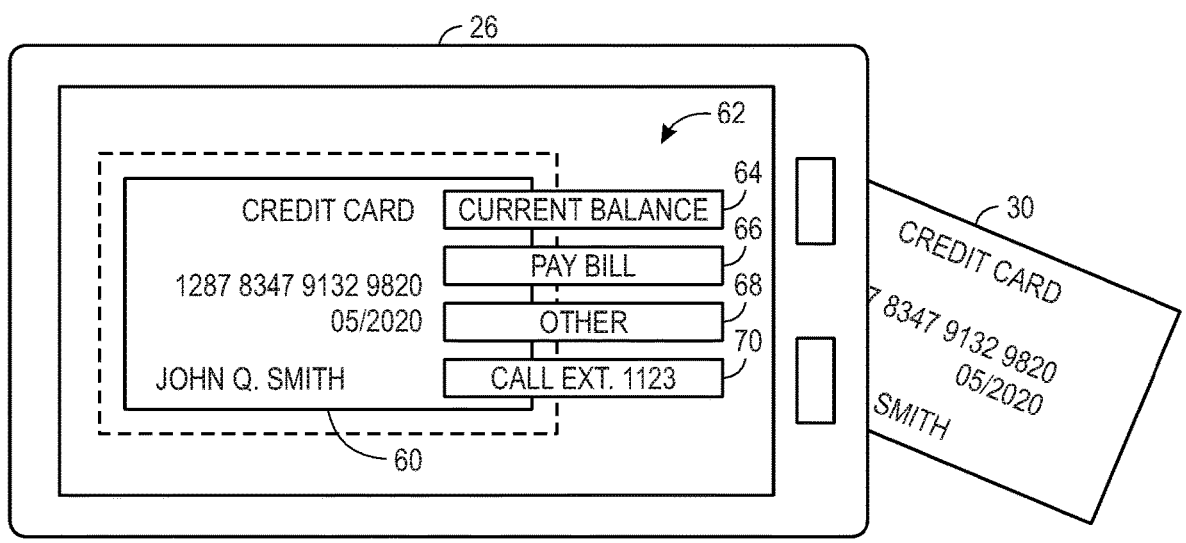
FIG. 3 illustrates an example visualization of the directed information links of FIG. 2 that may be displayed based on the image of the item, in accordance with embodiments described herein.

FIG. 3 illustrates an example visualization of information links 62 that may be displayed on the mobile device 26. As previously discussed, the mobile device 26 may be used to capture an image 60 of the commercial item 30 and send the image 60 to the computing system 10. The commercial item 30 may be a credit card, as in the illustrated embodiment, a billing statement, or any other suitable commercial item. Based on the type of commercial item 30 and, in some embodiments, authentication of the customer, the computing system 10 may provide the information links 62 relevant to the commercial item 30 to the mobile device 26, such that the information links 62 may be displayed with the image 60. As previously discussed, the displayed image 60 may be an image of commercial item 30 captured by the mobile device 26 or a replacement image of the commercial item 30 used to confirm the type or identity of the commercial item 30. As in the illustrated embodiment, the relevant information links 62 may be displayed via the mobile device 26 as a superimposed overlay on the image 60. The relevant information links 62 may include accessible links or information relevant to the commercial item 30, which may be determined based at least in part on frequently asked questions and/or frequently accessed actions related to the type of commercial item from call and/or search history data.

As such, the relevant information links 62 may include general information relevant to the commercial item 30 and/or personal information relevant to the commercial item 30 and the respective customer. For example, as in the illustrated embodiment, the commercial item 30 is a credit card. An information link 64 may provide access to data regarding a current balance on the credit card, or may be a link to an indication of the current balance. Additionally, the relevant information links 62 may include an information link 66 that may provide access to a bill pay service that may enable the customer to pay the current balance. Further, the relevant information links 62 may include an information link 68 that may provide other information determined by the computing system 10 to be relevant to the commercial item 30. For instance, other information may include information regarding requests for extensions, increasing credit, fraud alert, credit score, etc. Therefore, the information links 62 determined and provided by the computing system 10 may decrease the quantity of calls the organization associated with the commercial item 30 may receive by offering relevant information and selections to the customer directed to the commercial item 30, and in some embodiments, the personal account of the customer.

In some embodiments, the relevant information links 62 may additionally include an information link 70 that may cause the mobile device 26 to call a direct organization representative that may be able to help the customer regarding the commercial item 30. As such, the information link 70 may enable the customer to directly call a specific representative that may have information regarding the commercial item 30. Therefore, the information link 70 may provide easier access to an appropriate representative, if the customer decides to call. Additionally, the computing system 10 may enable the appropriate representative to be aware of the commercial item 30 that the customer may be calling about before the customer provides an indication with regard to the commercial item 30. Further, the use of the information link 70 to contact the representative regarding the commercial item 30 may enable the customer to be authenticated prior to contacting the representative, which may enable more efficient calling and may reduce call time, if the customer choses to call. Further, the information link 70 and the computing system 10 may decrease the quantity of times that an incorrect representative may be contacted regarding certain commercial items. Therefore, the computing system 10 may decrease call volume to the provider for inquiries related to a commercial item 30, may enable quicker and easier access to information relevant to the commercial item 30 by the customer, and may even direct calls, if a customer still decides to call, to an appropriate representative to answer their inquiry.

Additionally, the computing system 10 may be trained to recognize service provider logos, or other identifiers, for service providers that may be affiliated or associated with the organization. Thus, in some embodiments, the commercial item 30 may be a logo or other identifier of a service provider. The service provider may be associated with the organization that supports that customer. As such, the computing system 10 may provide relevant information to the customer based on an affiliation or association between the organization and the other service provider. For instance, a discount may be offered to customers of the organization based on agreements or association between the organization and the service provider.

Figure 4:
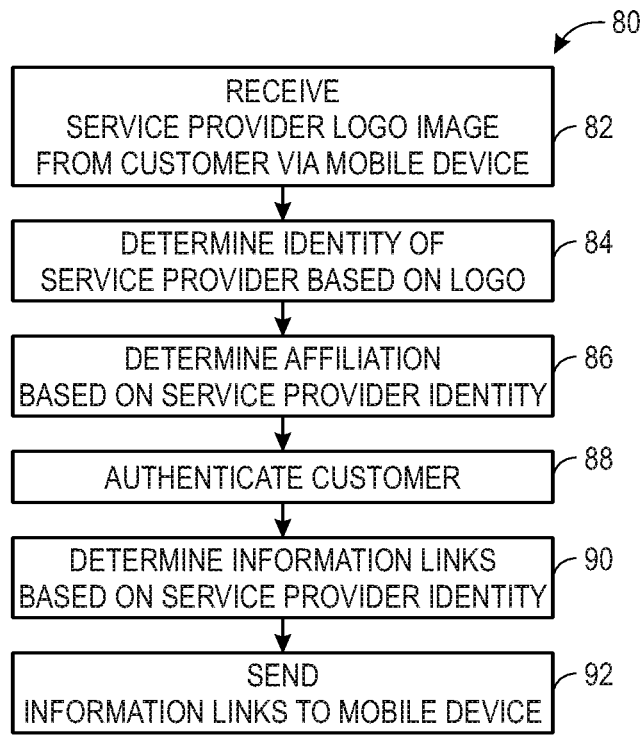
FIG. 4 illustrates a flow chart of a method for determining and displaying directed information links based on an affiliate entity logo image and data acquired from the data sources of FIG. 1, in accordance with embodiments described herein.

FIG. 4 illustrates a flow chart of a method 80 for providing relevant information to the customer based on the image of the logo and data acquired from the database 28. In general, the computing system 10 may receive an image of a logo and provide directed information links related to an affiliation or association between the service provider and the organization associated with the customer.

Although the method 80 is described in a particular order, it should be noted that the method 80 may be performed in any suitable order and is not limited to the order presented herein. It should also be noted that although each block is described as below in the method 40 as being performed by the computing system 10, other suitable computing systems may perform the methods described herein.

Referring now to FIG. 4, at block 82, the computing system 10 may receive the image of the logo from the mobile device 26. Similarly, as discussed above with reference to FIGS. 1 and 2, the customer may use the mobile device 26 to capture an image of the logo regarding which they would like more information. The computing system 10 may receive the image of the logo directly from the mobile device 26 or via the network 24. After receiving the image of the logo, at block 84, using image recognition, the computing system 10 may determine an identity of the logo. The identity may include the name, location, and the like, of the service provider associated with the logo. In some embodiments, the computing system 10 may confirm the identity of the logo with the customer via the mobile device 26, such that a confirming image is provided. The confirming image maybe a stock image (e.g., available digital image) of the logo received from the customer, which may be saved in the database 28. In such embodiments, the replacement image of the logo may be displayed on the mobile device 26 and may be used by the computing system 10 to identify the service provider and determine the relevant information links. Further, in some embodiments, if the replacement image of the logo is used, which may increase efficiency as the image quality may be greater, the computing system 10 may populate any identifiers of the service provider from the image received from the mobile device 26 onto the replacement image of the logo.

Then, at block 86, the computing system 10 may determine whether an affiliation exists between the organization and the service provider based on the identity of the service provider and data from the database 28. The computing system 10 may be trained, via machine learning, to recognize the logos, or other identifiers, of service providers based on other stored images of logos and/or identifies. As such, the computing system 10 may determine which service provider the service provider logo corresponds to and whether an affiliation or association between the organization and the service provider is defined. Any affiliations the organization may have with other service providers and their terms may be stored in the database 28.

After the computing system 10 has identified the service provider in the image received from the mobile device 26 and has determined the terms of the corresponding affiliation, in some embodiments, at block 88, the computing system 10 may authenticate the (e.g., verify) the identity of the customer. Authentication of the customer may be performed based on the mobile device 26. In some embodiments, the mobile device 26, or an application used to send the image of the logo to the computing system 10, may contain identifiers that may identify and authenticate the customer. For example, an application used to send the image of the logo to the computing system 10 may be a password-protected application. As another example, the mobile device 26 and/or the application that may be used to send the image of the logo to the computing system 10 may be associated with an account of the customer. Further, in some embodiments, the computing system 10 may receive one or more images of the customer's face that may be used to authenticate the customer. Such authentication may verify that the information provided by the computing system 10 is being provided to the correct customer, and, in some embodiments, may enable the information provided to be personalized to the customer, as service provider affiliations may vary based on the account of the particular customer.

Next, at block 90, the computing system 10 may determine which information and/or information links are relevant based on the logo, the identity of the service provider, and/or the determined affiliation. For example, if the service provider is a rental car service, the computing system 10 may determine whether any discounts are available to the customer based on the affiliation data from the database 28. After the computing system 10 has determined the relevant information links, at block 92, the computing system 10 may send the determined relevant information links to the mobile device 26. The information links may be displayed via the mobile device 26 as a superimposed overlay on the image of the service provider logo, as discussed in greater detail with reference to FIG. 5. As such, the computing system 10 may provide the customer with on-demand directed information and/or accessible links based on affiliations between service providers and an organization associated with the customer. The customer may then be able to access the provided relevant information links via the mobile device 26 to view and utilize the affiliation benefits, without working through a search, call menu, or representative.

Figure 5:
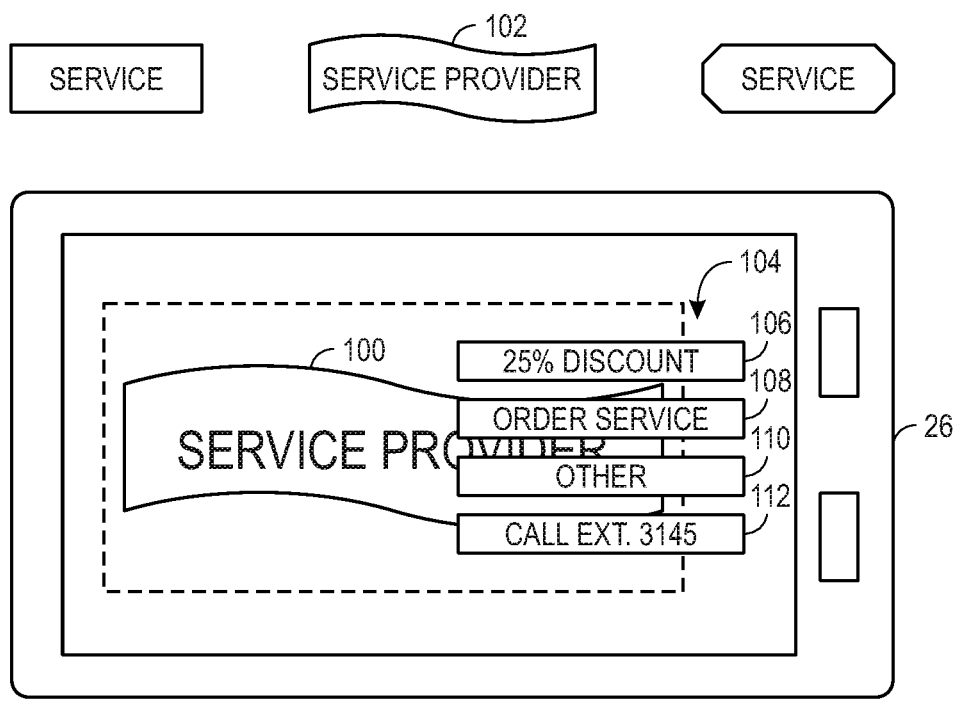
FIG. 5 illustrates an example visualization of the directed information links of FIG. 4 that may be displayed based on the affiliate entity logo image, in accordance with embodiments described herein.

FIG. 5 illustrates an example visualization of information links 104 that may be displayed on the mobile device 26 based on an identified logo. As previously discussed, the mobile device 26 may capture an image 100 of the logo 102 and send the logo image 100 to the computing system 10. The service provider may be any organization with an affiliation or partnership with the organization associated with the customer. Based on the logo 102, the determined affiliation between the service provider and the organization, and, in some embodiments, authentication of the customer, the computing system 10 may provide the information links 104 relevant to the service provider to the mobile device 26, such that the mobile device 26 may add the information links 104 to the image of the logo 100. As previously discussed, the displayed image 100 of the logo may be an image of logo 102 captured by the mobile device 26 or a replacement image of the logo 102 used to confirm the type or identity of the logo 102. As in the illustrated embodiment, the relevant information links 104 may be displayed via the mobile device 26 as a superimposed overlay on the logo image 100. The relevant information links 104 may include accessible links or information relevant to the service provider and/or the corresponding affiliation.

As such, the relevant information links 104 may include general information relevant to the service provider and the corresponding affiliation and/or personal information relevant to the particular customer regarding the service provider. For example, if the service provider is a rental car service, an information link 106 may indicate a discount provided to the customer based on an affiliation between the organization associated with the customer and the service provider, or may be a link to an indication of the relevant discount. Additionally, the relevant information links 104 may include an information link 108 that may be a quick link to an ordering service that may enable the customer to order a rental car utilizing the affiliation discount. Further, the relevant information links 104 may include an information link 110 that may provide other information determined by the computing system 10 to be relevant to the customer with regard to the service provider or the corresponding affiliation. Therefore, the information links 104 determined and provided by the computing system 10 may enable a decrease in the quantity of calls the organization may receive regarding affiliate services by offering on-demand relevant information and selections to the customer directed to the specific service provider, and in some embodiments, the personal account of the customer.

In some embodiments, the relevant information links 104 may additionally include an information link 112 that may be a link to cause the mobile device to call a direct provider representative that may be able to help the customer with information regarding the service provider and the corresponding affiliation. As such, the information link 112 may enable the customer to directly call a specific representative that may have information regarding the service provider. Therefore, the information link 112 may provide easier access to an appropriate representative, if the customer decides to call. Additionally, the computing system 10 may enable the appropriate representative to be aware of the service provider the customer may be calling about. Further, the use of the information link 112 to contact the representative regarding the service provider and the corresponding affiliation may enable the customer to be authenticated prior to contacting the representative, which may enable more efficient calling and may reduce call time. Further, the information link 112 and the computing system 10 may decrease the quantity of times that an incorrect representative may be contacted regarding certain service providers. Therefore, the computing system 10 may decrease call volume to the organization for inquiries related to service provider affiliations, may enable quicker and easier access to information relevant to such affiliations by the customer, and may even direct calls, if an customer still decides to call, to an appropriate representative to answer their inquiry.

The technical effects of the systems and methods described herein include utilizing an image of a commercial item and call and/or search history data to determine and provide on-demand information links relevant to the image of the commercial item to a customer via a mobile device. Such on-demand and directed information may enable quick and easy access by the customer to inquiries regarding the commercial item. Further, the systems and methods described herein may reduce the quantity of calls that the organization may receive regarding inquiries regarding the commercial items by determining and providing information relevant to specific commercial items. Further, providing on-demand and directed information may decrease call times by providing a direct link to an appropriate representative, providing awareness of the commercial item that may be the subject of the call, and may authenticate the customer prior to the call.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
   one or more biometric sensors configured to transmit a signal indicative of authentication information;
   a database comprising a plurality of datasets regarding a plurality of training images and historical data of one or more users; and
   a processor configured to communicatively couple to a mobile electronic device, wherein the processor is configured to:
   authenticate a user based at least in part on the authentication information from the one or more biometric sensors prior to communicatively coupling the processor to the mobile electronic device, wherein the authentication information comprises one or more features detected by the one or more biometric sensors;
   communicatively couple the processor and the mobile electronic device in response to the user being authenticated;
   receive the historical data from the database associated with the user in response to the user being authenticated;
   receive an image of a credit card from the mobile electronic device, wherein the image is presented on a display of the mobile electronic device;
   determine an identity of the credit card based on the image and the plurality of datasets in the database, wherein the identity of the credit card is determined by:
   retrieving the plurality of training images associated with the credit card in the database;
   identifying one of the plurality of training images based on one or more features present in the image, wherein the one of the plurality of training images comprises a stock image;
   replacing the image of the credit card on the display of the mobile electronic device with the stock image;
   receiving a confirmation input indicative of a confirmation of the identity of the credit card in response to the stock image replacing the image; and
   determining the identity of the credit card based on the stock image and the confirmation input;
   identify a service provider associated with the credit card based on a relationship between the identity and the authentication information;
   determine one or more information links relevant to the user based on the identity, the historical data of the user, and the service provider, wherein the one or more information links are configured to display information regarding the credit card, and wherein at least one of the one or more information links comprises a direct contact link configured to cause the processor to communicatively couple to a computing device associated with the service provider via a phone number;
   send the one or more information links to the mobile electronic device, wherein the mobile electronic device is configured to:
   replace the image presented on the display with the stock image; and
   display the one or more information links with the stock image on the display of the mobile electronic device; and
   communicatively couple the processor and the computing device via the phone number in response to receiving an input from the user via the at least one of the one or more information links.

2. The system of claim 1, wherein the mobile electronic device is configured to superimpose the one or more information links over the stock image via the display.

3. The system of claim 1, wherein the authentication information further comprises a name of the user, a phone number, a phone number of the mobile electronic device, a number of the credit card, an account associated with the user, or a combination thereof.

4. The system of claim 1, wherein the one or more information links comprise a current balance link, a bill pay link, another information link, or any combination thereof.

5. The system of claim 1, wherein the credit card comprises a logo or an identifier associated with the service provider.

6. The system of claim 5, wherein the processor is configured to determine an affiliation between an organization associated with the user of the mobile electronic device and the service provider identified by the logo or the identifier.

7. The system of claim 6, wherein the one or more information links comprise an available discount link, a service ordering link, another information link, or any combination thereof determined based on the affiliation.

8. The system of claim 1, wherein the direct contact link is configured to cause the mobile electronic device to call the phone number that corresponds to the service provider associated with the credit card.

9. The system of claim 1, wherein the historical data of the user comprises search history data, call history data, frequently asked questions, frequently accessed actions, or a combination thereof.

10. The system of claim 1, wherein the processor is configured to authenticate the user of the mobile electronic device based on one or more identifiers on the credit card.

11. A non-transitory computer-readable medium comprising computer-executable instructions that, when executed, cause a processor to:
    receive a signal indicative of authentication information from one or more biometric sensors;
    authenticate a user based on authentication information associated with the user, wherein the user is authenticated based on one or more features associated with the user detected via the one or more biometric sensors accessible to the processor;
    communicatively couple the processor and an electronic device of the user in response to the user being authenticated;
    receive an image of a credit card from the electronic device, wherein the image comprises an indication of a service provider, and wherein the image is presented via a display of the electronic device;
    determine an identity of the credit card based on the image, wherein the identity of the credit card is determined by:
        retrieving a plurality of training images associated with the credit card in a database,
        identifying one of the plurality of training images based on one or more features present in the image, wherein the one of the plurality of training images comprises a stock image;
        replacing the image presented via the display of the electronic device with the stock image;
        receiving a confirmation input indicative of a confirmation of the identity of the credit card in response to the stock image replacing the image; and
        determining the identity of the credit card based on the stock image and the confirmation input;
    determine an identity of the service provider based on the identity and the authentication of the user;
    determine an affiliation between the user and the identity of the service provider;
    determine one or more information links associated with the service provider based on the affiliation, wherein at least one of the one or more information links comprises a direct contact link corresponding to one or more representatives associated with the service provider, wherein the one or more representatives are identified based on a relationship between the user and the service provider, wherein the direct contact link is configured to cause the processor to communicatively couple to one or more computing devices associated with the one or more service representatives via one or more phone numbers;
    send the one or more information links to the electronic device, wherein the electronic device is configured to:
        replace the image presented on the display of the electronic device with the stock image; and
        display the one or more information links with the stock image on the display of the electronic device; and
    communicatively couple the processor and the computing device via the phone number in response to receiving an input from the user via the at least one of the one or more information links.

12. The non-transitory computer-readable medium of claim 11, wherein the indication comprises a logo associated with the service provider.

13. The non-transitory computer-readable medium of claim 11, wherein the one or more information links are associated with one or more offers for discounts.

14. The non-transitory computer-readable medium of claim 11, wherein the computer-executable instructions cause the processor to authenticate the user based on one or more indicators provided via the image.

15. A method, comprising:
    receiving, via one or more sensors accessible to a processor, authentication information associated with a user of a mobile electronic device;
    authenticating, via the processor, the user based on authentication information, wherein the user is authenticated based on one or more features associated with the user detected via the one or more sensors;
    communicatively couple, via the processor, the processor and the mobile electronic device in response to the user being authenticated;
    retrieving, via the processor, a search history associated with the user from a database in response to authenticating the user;
    receiving, via the processor, an image of a credit card from the mobile electronic device associated with the user, wherein the image is presented on a display of the mobile electronic device;
    determining, via the processor, an identity of the credit card based on the image and a plurality of datasets stored in a database, wherein the identity of the credit card is determined by:
        retrieving a plurality of training images associated with the credit card in the database;
        determining the identity of the credit card based on one of the plurality of training images, where the one of the plurality of training images is a stock image;
        replacing the image presented on the display of the mobile electronic device with the stock image in response to determining the identity of the credit card; and receiving a confirmation input indicative of a confirmation of the identity of the credit card in response to replacing the image with the stock image; and determining the identity of the credit card based on the stock image and the confirmation input;

identifying a service representative associated with the credit card based on a relationship between the identity and the user;

determining, via the processor, one or more information links relevant to the credit card based on the identity, the service representative, and the search history, wherein the one or more information links are configured to display information regarding the credit card, and wherein at least one of the one or more information links comprises a direct contact link configured to cause the processor to communicatively couple to a computing device associated with the service representative via a phone number;

sending, via the processor, the one or more information links to the mobile electronic device, wherein the mobile electronic device is configured to:
replace the image presented on the display with the stock image; and
display the one or more information links with the replacement stock image on the display; and
communicatively coupling the processor and the computing device via the phone number in response to receiving an input from the user via the at least one of the one or more information links.

16. The method of claim 15, wherein the mobile electronic device is configured to overlay the one or more information links on the stock image displayed via an electronic display communicatively coupled to the mobile electronic device.

17. The method of claim 15, wherein the authentication information comprises
image data representative of a face of the user.

18. The method of claim 15, wherein the one or more informational links comprise one or more network links related to one or more frequently asked questions, one or more frequently accessed actions, or both.

19. The method of claim 15, wherein the one or more informational links comprise a first link to access an indication of a current balance, a second link to pay the current balance due, a third link to request a credit increase, or any combination thereof.

20. The method of claim 15, wherein the one or more informational links comprise a URL link configured to cause the processor to connect to one or more websites associated with the one or more information links.

* * * * *

UNITED STATES PATENT AND TRADEMARK OFFICE
CERTIFICATE OF CORRECTION

| | | |
|---|---|---|
| PATENT NO. | : 11,430,028 B1 | Page 1 of 1 |
| APPLICATION NO. | : 16/200084 | |
| DATED | : August 30, 2022 | |
| INVENTOR(S) | : Chavez et al. | |

It is certified that error appears in the above-identified patent and that said Letters Patent is hereby corrected as shown below:

On the Title Page

Item (57), under "ABSTRACT", in Column 2, Lines 3-4, delete "communicative" and insert -- communicatively --, therefor.

In the Specification

In Column 1, Line 55, delete "communicative" and insert -- communicatively --, therefor.

In Column 5, Line 14, delete "may be and" and insert -- may be an --, therefor.

In Column 8, Line 42, delete "choses" and insert -- chooses --, therefor.

In Column 9, Line 45, delete "identifies." and insert -- identifiers. --, therefor.

In Column 11, Line 35, delete "an customer" and insert -- a customer --, therefor.

In the Claims

In Column 13, Line 54, in Claim 11, delete "database," and insert -- database; --, therefor.

In Column 14, Line 67, in Claim 15, delete "card; and" and insert -- card; --, therefor.

In Column 15, Line 26, in Claim 15, delete "replacement stock" and insert -- stock --, therefor.

Signed and Sealed this
Twenty-first Day of March, 2023

Katherine Kelly Vidal
*Director of the United States Patent and Trademark Office*